(12) United States Patent
Uhl

(10) Patent No.: US 6,464,018 B1
(45) Date of Patent: Oct. 15, 2002

(54) PORTABLE HANDHELD DRILLING MACHINE HAVING AN INTERNAL COMBUSTION ENGINE

(75) Inventor: Klaus-Martin Uhl, Baltmannsweiler (DE)

(73) Assignee: Andreas Stihl AG & Co., Waiblingen (DE)

( * ) Notice: Subject to any disclaimer, the term of this patent is extended or adjusted under 35 U.S.C. 154(b) by 135 days.

(21) Appl. No.: 09/715,136

(22) Filed: Nov. 20, 2000

(30) Foreign Application Priority Data

Nov. 20, 1999 (DE) .......................................... 199 55 930

(51) Int. Cl.[7] .............................................. B25D 16/00
(52) U.S. Cl. ..................... 173/162.2; 173/210; 173/216; 173/217
(58) Field of Search .......................... 173/162.2, 162.1, 173/170, 210, 216, 217

(56) References Cited

U.S. PATENT DOCUMENTS

| | | | | |
|---|---|---|---|---|
| 1,647,554 A | * | 11/1927 | Trapnell | 123/193.1 |
| 1,934,935 A | * | 11/1933 | Luxmore | 173/137 |
| 2,479,750 A | * | 8/1949 | Lewandowski | 123/195 R |
| 3,176,547 A | * | 4/1965 | Schnacke | 192/34 |
| 3,845,557 A | * | 11/1974 | Bailey | 173/162.2 |
| 3,990,523 A | * | 11/1976 | Schramm et al. | 16/111.1 |
| 4,227,840 A | * | 10/1980 | Thivierge | 144/104 |
| 4,615,398 A | * | 10/1986 | Nagashima | 173/162.2 |
| 5,025,870 A | * | 6/1991 | Gantner | 173/162.1 |
| 5,213,167 A | * | 5/1993 | Best et al. | 173/162.2 |
| 5,241,932 A | | 9/1993 | Everts | 123/195 R |
| 5,368,107 A | * | 11/1994 | Taomo | 173/162.2 |
| 5,692,306 A | * | 12/1997 | Stoll et al. | 173/162.1 |
| 5,697,456 A | * | 12/1997 | Radle et al. | 173/162.2 |

FOREIGN PATENT DOCUMENTS

| | | |
|---|---|---|
| DE | 1241093 | 5/1967 |
| DE | 3913426 | 10/1990 |
| GB | 2187664 | 9/1987 |

* cited by examiner

*Primary Examiner*—Scott A. Smith
*Assistant Examiner*—Nathaniel Chukwurah
(74) *Attorney, Agent, or Firm*—Walter Ottesen (57) ABSTRACT

The invention relates to a portable handheld drilling machine having an internal combustion engine (21) and a transmission (2) accommodated in a housing (3). The output shaft (4) of the transmission (2) carries a tool chuck (5) and the input shaft of the transmission is driven by the crankshaft (20) of the engine (21). The machine housing surrounds the cylinder (23), the crankcase (24), the exhaust-gas muffler (26) and the carburetor (25) of the engine (21). A handle is attached to the machine housing for holding and guiding the portable handheld drilling machine. To provide a drilling machine which can be reliably guided, the machine housing (1) is configured open at its front end face (10) and at its rear end face (27) in the direction of the longitudinal axis (8) of the machine. The transmission housing (3) is connected to the engine block (23, 24) of the engine (21) and projects with a lateral play (v) out of the machine housing (1) through the forward end face (27). The housing spiral (16) of the cooling air blower (11) lies with a lateral play (u) in the rearward end face (10) of the machine housing (1). The handle (9) extends over the open rear end face (10) in a bridge-like manner.

19 Claims, 6 Drawing Sheets

PORTABLE HANDHELD DRILLING MACHINE HAVING AN INTERNAL COMBUSTION ENGINE

BACKGROUND OF THE INVENTION

A portable handheld drilling machine having an internal combustion engine is disclosed in British patent publication 2,187,664. In this drilling machine, the following components are arranged one behind the other: a transmission, a clutch, an internal combustion engine and a rear handle. An output shaft having a tool chuck extends out from the transmission. The tool chuck accommodates different tools which can be exchanged including drill bits, screw bits or the like. The transmission housing is securely attached to a machine housing wherein the engine is mounted with its cylinder, crankcase, exhaust-gas muffler and carburetor. For cooling the engine, a cooling air blower is mounted on the end of the crankshaft at the side facing away from the transmission housing. The cooling air blower supplies cooling air via a housing spiral to the machine housing. The rearward handle is attached to the rear back wall of the machine housing and serves for holding and guiding the drilling machine.

The housing is configured with spacing to the individual engine elements and is closed on all sides. Because of this housing, the engine is very large which limits its use possibilities. In addition, a drilling machine built this large is also very heavy because of the voluminous housing which affects the manipulability thereof.

SUMMARY OF THE INVENTION

It is an object of the invention to provide a portable handheld drilling machine having an adapted external housing which hardly limits the use possibilities and keeps the weight of the drilling machine very low.

The portable handheld drilling machine of the invention defines a longitudinal axis and includes: an internal combustion engine having an engine block and a crankshaft; a transmission housing accommodating a transmission therein; the transmission having an input shaft driven by the crankshaft and having an output shaft accommodating a chuck thereon; the crankshaft having an end facing away from the transmission; an engine housing for accommodating the engine therein and the engine housing having a housing spiral formed therein; a cooling air blower mounted on the end of the crankshaft for moving cooling air though the engine housing via the spiral; the engine including a cylinder, crankcase, carburetor and exhaust-gas muffler and the engine housing surrounding the cylinder, the crankcase, the carburetor and the exhaust-gas muffler; the engine housing having a handle formed thereon for holding and guiding the machine; the engine housing having a front end and a rear end in the direction of the longitudinal axis; the engine housing being open in the front and rear ends; the transmission housing being attached to the engine block; the transmission housing projecting in the direction of the longitudinal axis through the front end with a peripherally extending play (v); the housing spiral being disposed in the rear end with a peripherally extending play (u); and, the engine housing having a handle formed thereon for holding and guiding the machine and the handle extending bridge-like over the rear end of the engine housing.

The configuration of the engine housing having open ends reduces the total weight. The transmission housing is attached to the engine block. For this reason, all forces are conducted directly into the engine block. The housing itself is relieved of load and can therefore be correspondingly configured with less material. Subdividing the portable handheld drilling machine into an inner work unit and an outer housing makes possible a relative movement between the engine housing and the inner unit so that a vibration decoupling of the inner unit from the external housing is possible.

The unit, which is formed by the transmission housing and the engine, is advantageously held in the engine housing via anti-vibration elements. Preferably, such anti-vibration elements are mounted, on the one hand, on the engine and, on the other hand, on the transmission housing. In each case, two diametrically opposite lying anti-vibration elements are provided with respect to a housing partition plane. In this way, a simple assembly of the anti-vibration elements is possible. Only with the assembly of the machine housing are the anti-vibration elements placed and thereby built in. The machine housing is subdivided into two housing shells in the direction of the longitudinal axis of the drilling machine.

To achieve an advantageous performance with respect to guiding the drilling machine, the anti-vibration elements which are mounted on the transmission housing are arranged at a spacing in elevation to the anti-vibration elements provided on the engine. The anti-vibration elements of the engine are permitted to engage on the housing spiral of the cooling air blower in order to provide the largest possible spacing in the direction of the longitudinal axis of the drilling machine. In this way, all anti-vibration elements lie close to the open end faces of the machine housing.

In a preferred embodiment of the invention, an air filter housing is configured in a side wall of the machine housing. The air filter housing is preferably connected to an intake pipe ending in the machine housing. The intake pipe lies transversely to the longitudinal axis of the drilling machine and preferably extends to the opposite-lying side wall of the machine housing and is configured as one piece therewith. The intake pipe can be configured to be adapted in correspondence to the flow conditions and can especially be used as a resonance pipe in order to attenuate the intake noise. Advantageously, the inlet opening of the intake pipe lies in an intake zone to which substantially dirt-free combustion air is supplied via a vibration gap.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
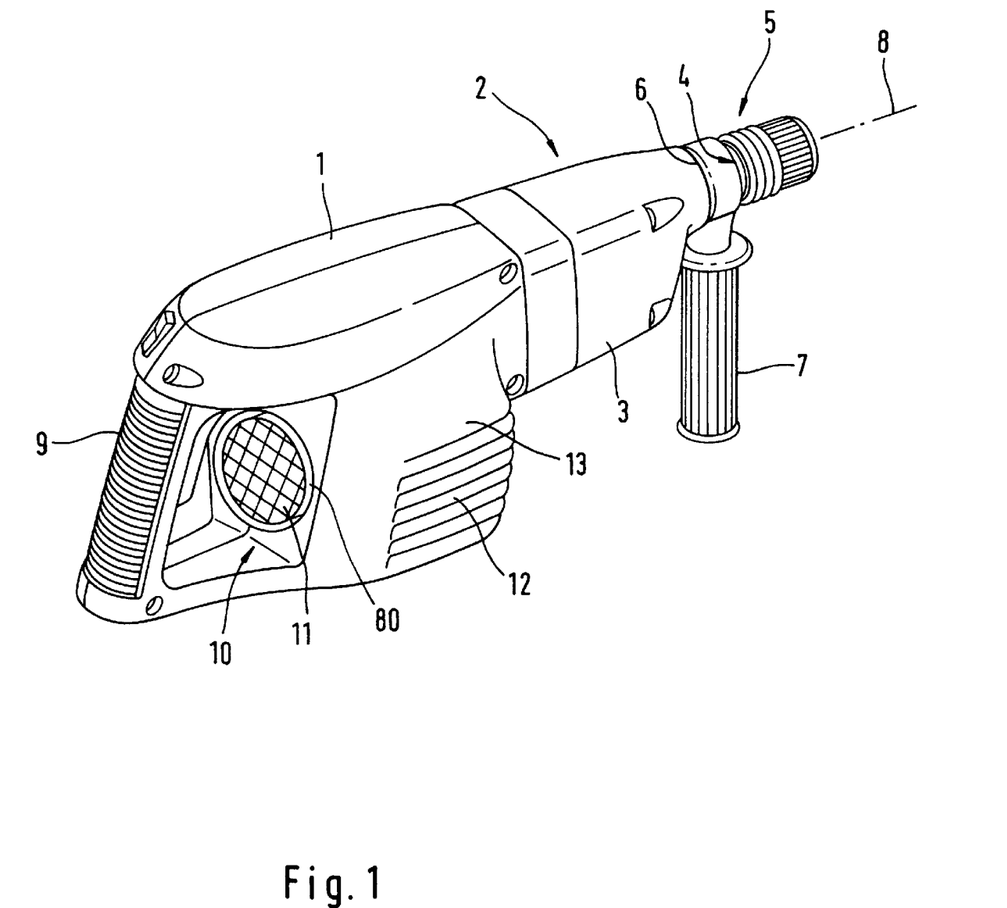
FIG. 1 is a perspective view showing the basic configuration of a handheld portable drilling machine according to the invention.

The portable handheld drilling machine shown in FIG. 1 essentially comprises a machine housing 1 having an internal combustion engine 21 (FIG. 3) as a drive motor. The engine 21 drives a transmission 2 via a centrifugal clutch. The transmission is mounted at an end of the machine housing 1 and preferably is encapsulated in a transmission housing 3 and has an output shaft 4 which carries a tool chuck 5. A forward handle 7 can be attached to a throat 6 of the transmission housing 3 adjacent the tool chuck 5. This handle can be rotated about the longitudinal axis 8 of the drilling machine and can be fixed in any desired rotational position. To hold and guide the drilling machine, a handle 9 is arranged at the rearward end face 10 viewed in the longitudinal direction 8 of the drilling machine. The handle 9 extends over the end face 10 in a bridge-like manner.

As indicated in FIG. 1, a cooling air blower 11 lies in the open end face 10 and draws cooling air by suction into the machine housing 1 in order to cool the internal combustion engine mounted therein. The engine can be a slit-controlled two-stroke engine, a valve-controlled two-stroke engine, a four-stroke engine or an internal combustion engine of another type.

As will be described hereinafter, the inducted cooling air is blown out laterally via cooling air slits 12 in the side wall 13 and via cooling air slits (not shown in FIG. 1) in the direction of the longitudinal axis 8 of the drilling machine toward the forward tool chuck 5. The constructive configuration of the drilling machine is shown in FIGS. 2 to 6.

Figure 2:
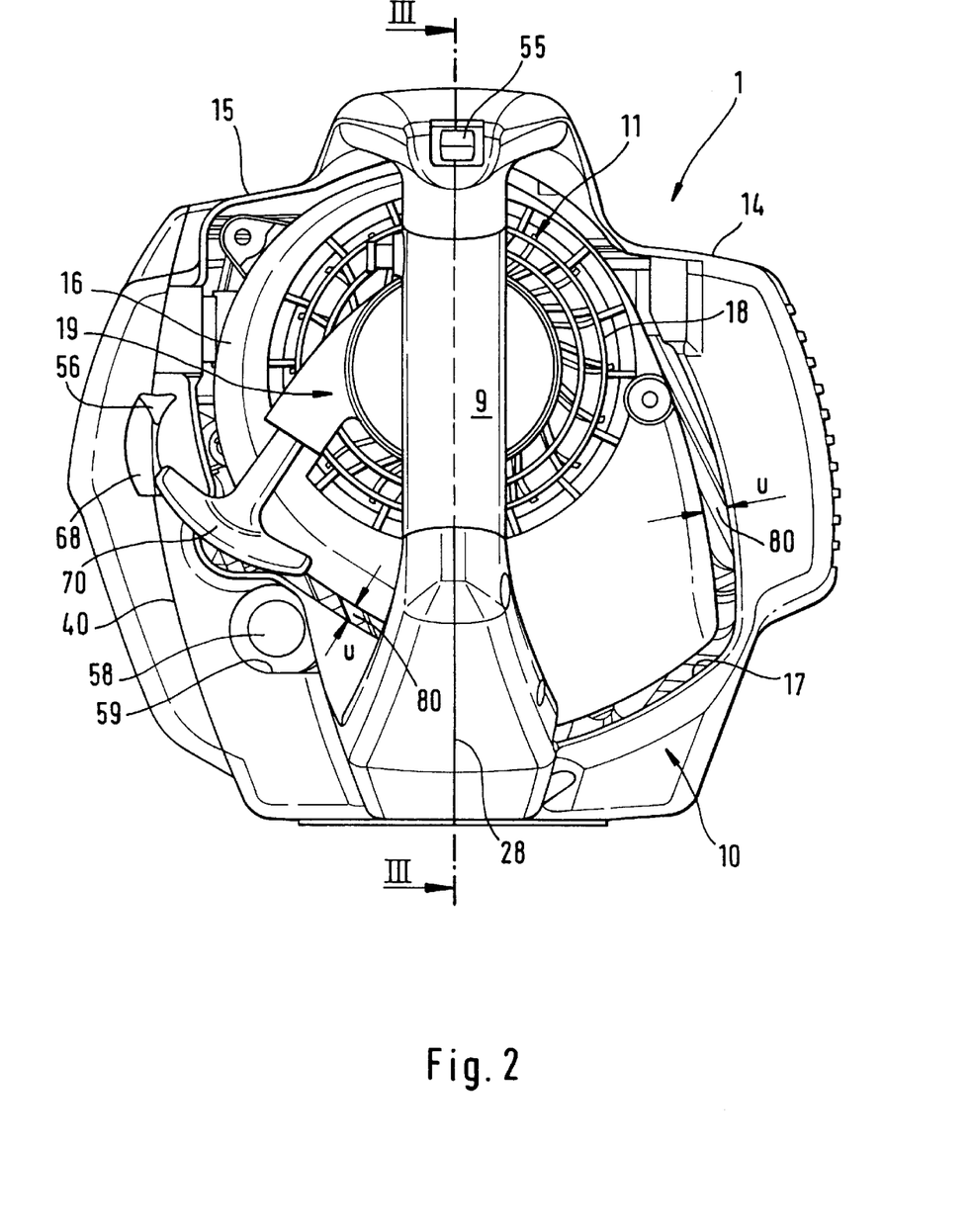
FIG. 2 is a plan view of the end face of a portable handheld drilling machine of the invention.

The configuration of the drilling machine in the region of the rearward end wall 10 can be seen in FIG. 2. The machine housing is subdivided into two housing shells 14 and 15 in the direction of the longitudinal axis 8. The housing shells 14 and 15 laterally enclose the engine 21. As shown in FIG. 2, the cooling air blower of the engine lies in the open end face 10. The housing spiral 16 of the cooling air blower 11 lies with a peripheral lateral spacing u to the edge 17 while defining a vibration gap 80 in the open end face 10. The housing spiral 16 is covered by an air-intake grid 18. A pull-rope starter 19 lies in the center of this grid. The handle 70 of the starter 19 viewed in plan in FIG. 2 is orientated laterally of the rearward handle 9 approximately tangentially to the cooling air spiral 16.

Figure 3:
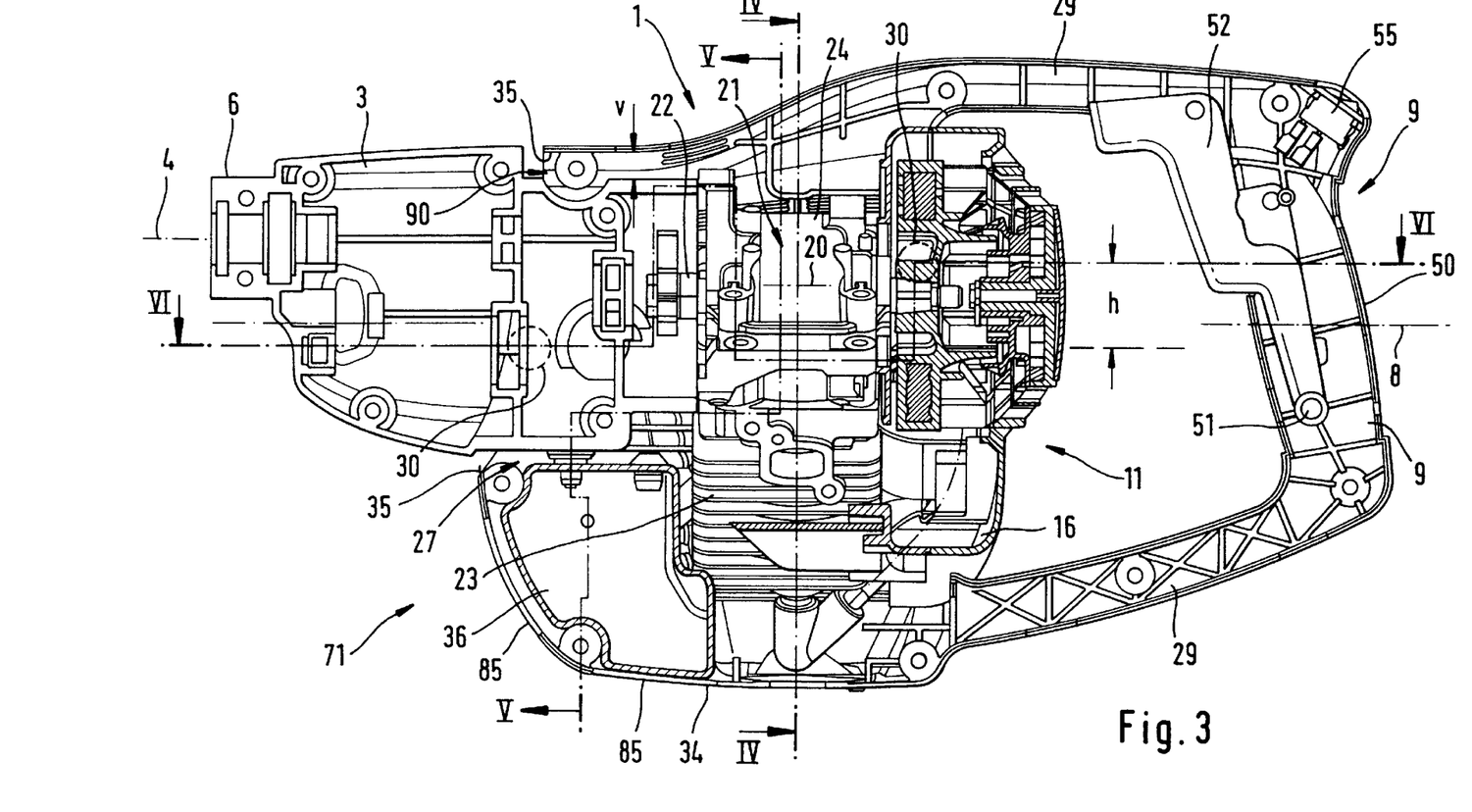
FIG. 3 is a section view taken along line III—III of FIG. 2.
Figure 4:
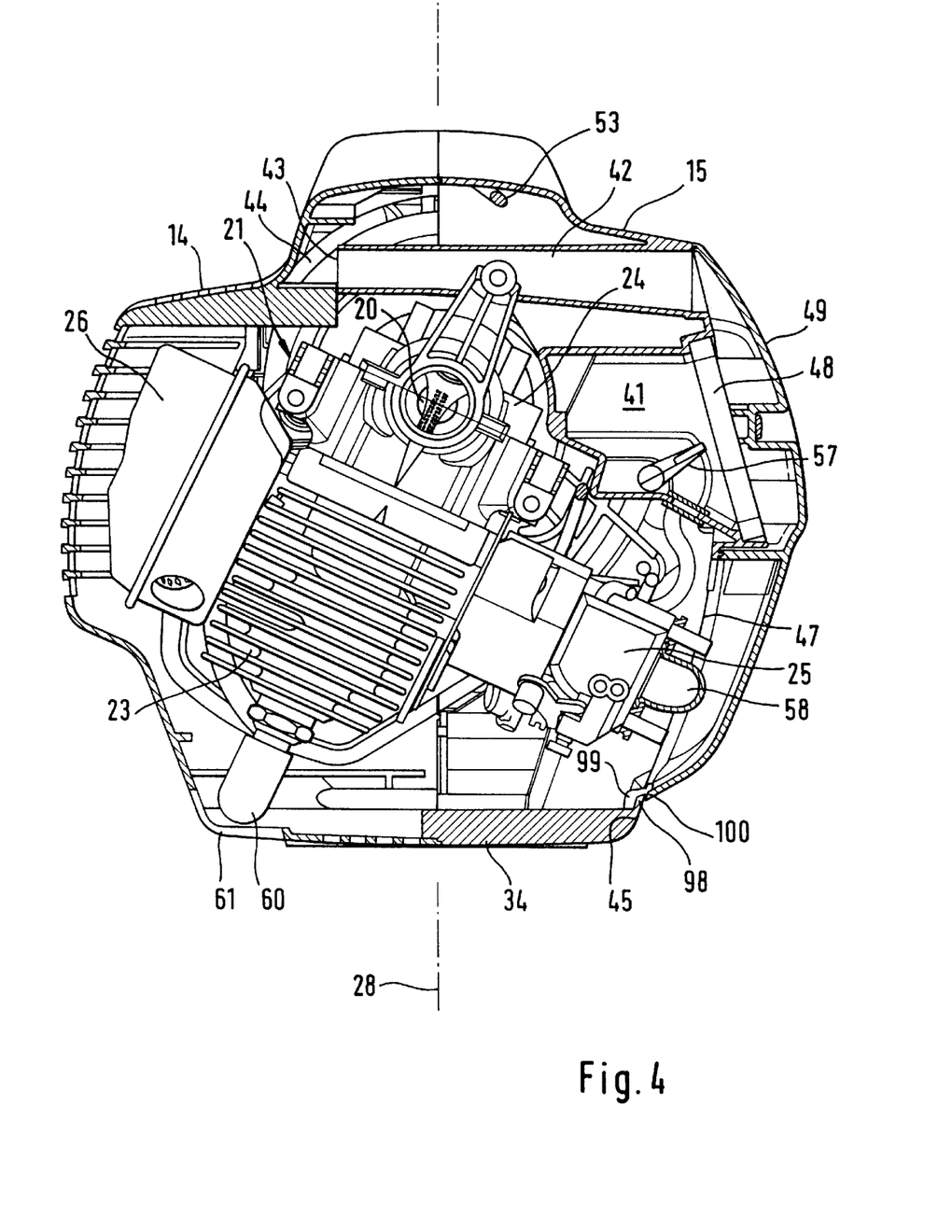
FIG. 4 is a section view taken along line IV—IV of FIG. 3.

As shown in FIG. 3, the cooling air blower 11 lies at the one end of a crankshaft 20 of the engine 21 whose other end 22 drives the input shaft (not shown) of the transmission mounted in the transmission housing 3. The cooling air blower 11 moves cooling air via the housing spiral 16 into the machine housing 1 which surrounds the cylinder 23, the crankcase 24, a carburetor 25 (FIG. 4) and an exhaust-gas muffler 26 (FIG. 4).

Figure 6:
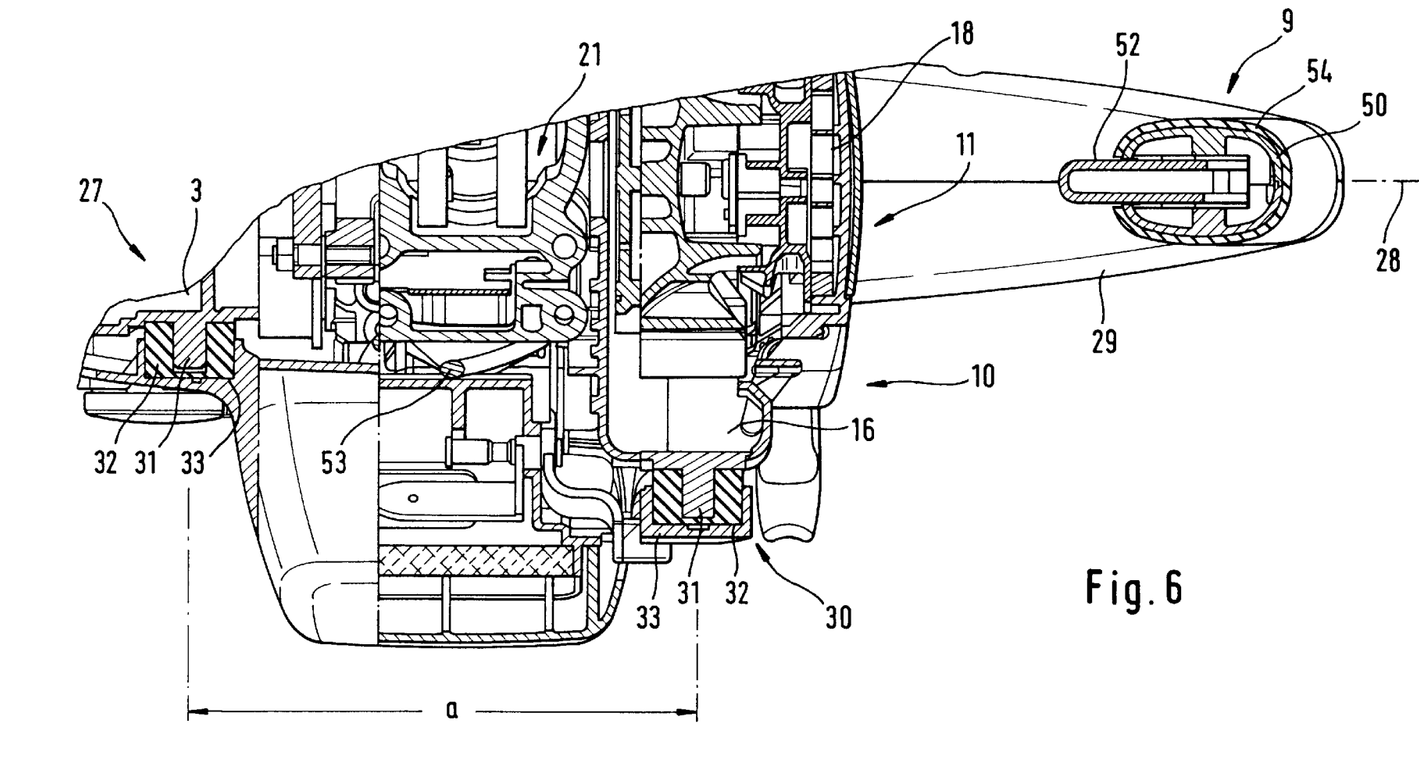
FIG. 6 is a detail view taken along line VI—VI of FIG. 3.

The engine 21 and the transmission housing, which is attached to the engine block or to the crankcase 24, conjointly define a rigid unit which is held in the machine housing 1 via anti-vibration elements 30 as shown in FIG. 6. The transmission housing 3 projects out of the forward end face of the machine housing 1 with a peripherally extending lateral play v whereby a vibration gap 90 is formed.

The rigid unit of the transmission housing 3 and the engine 21 are held in the machine housing by means of the anti-vibration elements 30 and the bridge-like rearward handle 9 is fixed to the machine housing 1 and is preferably configured as one piece therewith. For this reason, a vibration decoupling between the vibration generating drive unit and the housing shells protecting the same result.

The anti-vibration elements 30 are, as shown in FIG. 6, arranged, on the one hand, on the engine 21, namely on the housing spiral 16 of the cooling air blower 11 and, on the other hand, on the transmission housing 3. The anti-vibration elements 30 comprise essentially a formed-on lug 31 preferably on the transmission housing 3 or the housing spiral 16. The lug 31 is approximately perpendicular to the housing partition plane 28 and carries a sleeve-shaped to cup-shaped damping element 32 made of rubber, plastic or other suitable damping materials. The damping element 32 is held in receptacles 33 of the housing shells (14, 15) which are preferably manufactured as one piece with the housing shells (14, 15).

In FIG. 6, the anti-vibration elements 30 are shown which lie on one side of the partition plane 28. Corresponding anti-vibration elements lie at the same elevation on the other side of the partition plane 28. The lugs 31 have a common axis which lies at right angles to the housing partition plane 28.

The anti-vibration elements 30 lie close to the open end faces 10 and 27 and lie, referred to the longitudinal axis 8, at different elevations. This can be seen from the section view taken along line VI—VI in FIG. 3 and the illustration shown in FIG. 6. The anti-vibration elements provided on the engine, that is, on the housing spiral 16, lie close to the upper leg 29 of the rearward handle 9; whereas, the forward anti-vibration elements 30 lie lower by an elevation jump h. An excellent guiding characteristic is provided by the spacing h in the elevation position and the spacing a in the direction of the longitudinal axis 8. This excell ent guiding performance for an operator is associated with a substantial decoupling of the vibration burdened drive from the machine housing 1 and therefore from the handle 9.

Figure 5:
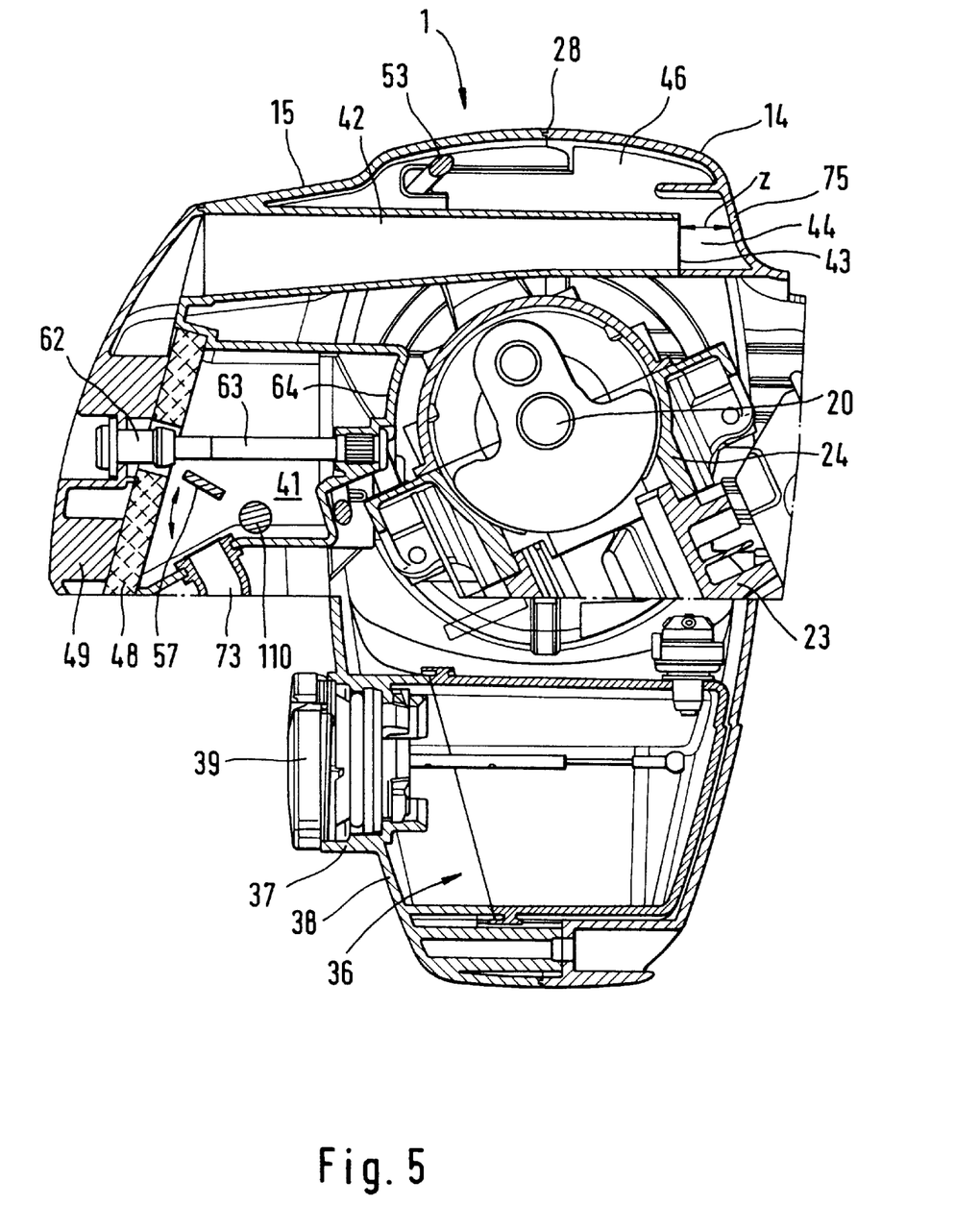
FIG. 5 is a section view taken along line V—V of FIG. 3.

As shown in FIGS. 3 and 5, the housing base 34 of the machine housing is drawn upwardly to the edge 35 of the forward open end face 27 so that the forward open end face 27 has a significantly smaller area than the rearward open end face 10. A fuel tank 36 is mounted within the machine housing 1 and preferably in the region 71 of the upwardly drawn face 34. Referred to the drive unit, the fuel tank 36 lies next to the cylinder 23 and below the transmission housing 3. The fuel tank 36 comprises a tank rump housing which is closed by a wall 38 of the machine housing 1. In the embodiment shown, the wall 38 is part of the housing shell 15 and includes a tank fill opening 37 which can be closed with a cover 39. The connection between the tank rump housing and the wall 38 takes place advantageously with friction welding. The tank rump housing is protected against mechanical damage by the surrounding wall of the machine housing 1. The tank rump housing comprises a transparent plastic; viewing windows are provided in the machine housing to provide an optical indication of the fill level.

An air filter housing 41 is configured in the side wall 40 of the housing shell 15 and is preferably configured as one piece. The air filter housing 41 draws combustion air by suction via an intake pipe 42 which lies in the machine housing and is especially formed thereon as one piece. The intake pipe 42 lies transversely to the longitudinal axis 8 and is preferably perpendicular to the housing partition plane 28. The length of the intake pipe 42 is so configured that it ends forward of the side wall 75 of the opposite-lying housing shell 15 with a small spacing z. The inlet opening 43 of the intake pipe lies in an intake zone 44 to which combustion air is supplied. This combustion air enters into the machine housing 1 via the vibration gap 90. Partition walls 46 are provided in the housing shells 14 and 15 and close off the intake zone 44 with respect to the inner cooling air. The partition walls 46 are configured as one piece with the machine housing 1.

The air filter housing 41 is mounted in a region above the carburetor 25 as shown in FIG. 4. A service window 47 is configured in the side wall 45 of the housing shell 15. The service window facilitates access to the carburetor 25 for the purpose of maintenance or for removing disturbances.

FIGS. 4 and 5 show that the air filter housing 41 is covered by a filter element 48. The filter element 48 is held secure in its position by the air filter cover 49 set thereon. The air filter cover 49 is formed larger than the housing 41 for closing the air filter housing. The air filter cover 49 is extended to the base 34 of the machine housing 1 in such a manner that it not only closes the air filter housing 41 but simultaneously also the service window 47. Advantageously, the edge 100 of the air filter cover 49 which is adjacent to the base 34 has several hooks 99 which grasp behind the edge 98 of the service window 47 whereby the cover is fixed. Especially two hooks 99 are provided. Openings in the side wall 45 can be provided through which the hooks 99 pass.

According to FIGS. 2 and 3, the rearward handle 9 is configured to have an approximately U shape. The legs 29 are configured so as to be wider in the connecting region to the housing shells 14 and 15 than the connecting piece 50 which connects the two legs 29 to each other. The connecting piece 50 lies approximately parallel and at a spacing to the open end face 10. The connecting piece 50 includes a bearing axis 41 which serves to pivotally hold a throttle lever 52. The throttle lever 52 projects on the side, which faces toward the cooling air blower 11, beyond the edge of the connecting piece 50 and of the upper leg 29 so that it can be easily grasped by the operator and actuated. The connection between the throttle lever 52 and the carburetor 25 is provided via a bowden cable 53 which runs in the machine housing 1. The bowden cable 53 is partially visible in FIG. 6. In FIG. 5, the bowden cable 53 is guided to the carburetor 25 through an opening in the partition wall 46.

As shown in FIG. 6, the connecting piece 50 has an outer surface 54 for optimal slip-free grasping.

An operating switch 55 is mounted at the elevation of the throttle lever 52 in the upper region between the connecting piece 50 and the upper leg 29. The operating switch 55 serves to electrically switch on and switch off the ignition. The other operator-controlled elements for starting and operating the portable handheld drilling machine can be seen with one view onto the rearward end wall 10. Thus, the starter lever 56 for the start gas and the choke 57 are held in the side wall 68 of the air filter housing 41 and thereby lie easily accessible for the operator. The choke 57 is advantageously provided as a flap in the air filter housing 41 to close the combustion air channel 73 and is displaceable via shaft 110 in the direction of the arrow by means of the lever 56.

In the same way as the start lever 56, the purger 58 is provided on the end face of the machine housing facing toward the connecting piece 50. For this purpose, a window 59 is cut out in, the edge region through which the elastic fuel-filled cap of the purger 58 can be actuated by the operator.

The end face of the machine housing 1 shown in FIG. 2 does not show any outlet opening for cooling air or combustion gases but shows only the intake air grid 18. In this way, it is ensured that the operator standing behind the machine does not get blown with cooling air or exhaust gas.

As shown in FIG. 4, a window 61 is also provided in the region of the spark plug 60 in the base 34 of the housing shell 15. An exchange of the spark plug 60 is possible through the window 61 without a disassembly of the machine housing 1.

The blowing out of cooling air as well as of the combustion exhaust gases takes place essentially laterally or via outlet openings which lie facing toward the transmission housing 3 (FIGS. 2 and 4).

According to FIGS. 4 and 5, the intake pipe 42 widens from its inlet opening 43 in the direction toward the air filter housing 41 and ends approximately at the elevation of the filter element 48 in the side wall 45 of the housing shell 15. The flow connection between the intake pipe 42 and the air filter housing 41 is provided by the hood-shaped air filter cover 49. Via the cover 49, essentially the entire filter element 48 is uniformly charged by the inflowing combustion air. The combustion air is guided from the air filter housing 41 to the carburetor 25 via an air channel 73.

The air filter cover 49 is fixed by means of a closure screw 62 on the housing side wall 45. The closure screw 62 is recessed in the cover and is seated on the threaded end of a bolt 63 which is anchored in the base 64 of the air filter housing 41 and projects through the filter element 48.

The rear handle 9 is partitioned as the machine housing 1. The machine housing 1 and the handle 9 have a common partition plane 28.

The internal combustion engine is mounted in such a manner that the crankshaft 20 lies approximately along the same axis with the output shaft 4. As shown in FIG. 4, the cylinder 23 lies inclined laterally to the base 34 of the machine housing 1. This configuration makes possible a very short spacing between the output shaft 4 and the outer contour of the upper leg 29 in the region of the upper leg 29 of the rear handle 9. This short spacing ensures the use of the portable handheld drilling machine even in tight corners or the like.

It can be advantageous to provide a carrier eyelet or the like in the region of the connecting piece 50 of the rear handle 9 for hooking into a carrier hook or the like. Preferably, the carrier eyelet is provided near the gravity center of the machine. An arrangement on the upper or lower side of the machine housing can also be advantageous.

It is understood that the foregoing description is that of the preferred embodiments of the invention and that various changes and modifications may be made thereto without departing from the spirit and scope of the invention as defined in the appended claims.

What is claimed is:

1. A portable handheld drilling machine defining a longitudinal axis and said portable handheld drilling machine comprising:

an internal combustion engine having an engine block and a crankshaft;

a transmission housing accommodating a transmission therein;

said transmission having an input shaft driven by said crankshaft and having an output shaft accommodating a chuck thereon;

said crankshaft having an end facing away from said transmission;

an engine housing for accommodating said engine therein and said engine housing having a housing spiral formed therein;

a cooling air blower mounted on said end of said crankshaft for moving cooling air though said engine housing via said spiral;

said engine including a cylinder, crankcase, carburetor and exhaust-gas muffler and said engine housing surrounding said cylinder, said crankcase, said carburetor and said exhaust-gas muffler;

said engine housing having a handle formed thereon for holding and guiding said machine;

said engine housing having a front end and a rear end in the direction of said longitudinal axis;

said engine housing being open in said front and rear ends;

said transmission housing being attached to said engine block;

said transmission housing projecting in the direction of said longitudinal axis through said front end with a peripherally extending play (v);

said housing spiral being disposed in said rear end with a peripherally extending play (u); and, said engine housing having a handle formed thereon for holding and guiding said machine and said handle extending bridge-like over said rear end of said engine housing.

2. The portable handheld drilling machine of claim 1, said engine housing being partitioned into two housing shells.

3. The portable handheld drilling machine of claim 2, said engine and said transmission conjointly defining a unit; and, said drilling machine further comprising anti-vibration elements for holding said unit in said engine housing; and, a first portion of said anti-vibration elements being provided on said transmission housing and a second portion of said anti-vibration element being provided on said engine.

4. The portable handheld drilling machine of claim 3, said engine housing defining a partition plane; said first portion including two of said anti-vibration elements on respective sides of said partition plane; and, said second portion also including two of said anti-vibration elements on respective sides of said partition plane.

5. The portable handheld drilling machine of claim 4, said first portion of anti-vibration elements lying at a spacing (h) in elevation relative to said second portion of anti-vibration elements.

6. The portable handheld drilling machine of claim 5, the anti-vibration elements of said second portion being mounted on said housing spiral.

7. The portable handheld drilling machine of claim 6, said first and second portions of said anti-vibration elements being disposed close to said front and rear ends of said engine housing, respectively.

8. The portable handheld drilling machine of claim 7, said front end encompassing a smaller area than said rear end.

9. The portable handheld drilling machine of claim 8, said engine housing having a base wall and said base wall being pulled up to the edge of said front end.

10. The portable handheld drilling machine of claim 9, further comprising a fuel tank within said engine housing in the region of the pulled up base wall and below said transmission housing.

11. The portable handheld drilling machine of claim 10, said fuel tank being formed in part by said base wall and said part of said base wall having a tank fill opening formed therein.

12. The portable handheld drilling machine of claim 2, said two housing shells conjointly defining a partition plane; and, said handle being partitioned by said partition plane.

13. The portable handheld drilling machine of claim 1, said engine housing having a side wall; and, said engine including an air filter housing configured in said side wall.

14. The portable handheld drilling machine of claim 13, said engine including an intake pipe and said intake pipe being connected to said air filter housing.

15. The portable handheld drilling machine of claim 14, said intake pipe being aligned transversely to said longitudinal axis and extending to the opposite lying side wall of said engine housing.

16. The portable handheld drilling machine of claim 15, said engine housing defining a vibration gap; and, said intake pipe having an opening lying in an intake zone to which air is supplied via said vibration gap.

17. The portable handheld drilling machine of claim 13, said air filter being mounted in a region above said carburetor.

18. The portable handheld drilling machine of claim 13, said air filter housing including a cover and said engine housing including a side wall; and, said side wall including a service window; and, said air filter cover simultaneously closing said service window.

19. The portable handheld drilling machine of claim 1, said engine housing including a side wall and said side wall including a service window to facilitate access to said carburetor.

\* \* \* \* \*